(12) United States Patent
Uguen

(10) Patent No.: US 7,120,038 B2
(45) Date of Patent: Oct. 10, 2006

(54) CONTROL SYSTEM FOR A VOLTAGE CONVERTER

(75) Inventor: Emeric Uguen, La Fresnaye au Sauvage (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/559,911

(22) PCT Filed: Jun. 3, 2004

(86) PCT No.: PCT/IB2004/001884

§ 371 (c)(1),
(2), (4) Date: Dec. 7, 2005

(87) PCT Pub. No.: WO2004/109897

PCT Pub. Date: Dec. 16, 2004

(65) Prior Publication Data

US 2006/0133121 A1    Jun. 22, 2006

(30) Foreign Application Priority Data

Jun. 11, 2003    (FR) .................................. 03 50210

(51) Int. Cl.
*H02M 3/158*    (2006.01)

(52) U.S. Cl. ...................................................... 363/59
(58) Field of Classification Search .................. 363/59, 363/60; 323/884, 828, 288; 327/337, 374
See application file for complete search history.

(56) References Cited

U.S. PATENT DOCUMENTS

| | | | | |
|---|---|---|---|---|
| 5,646,513 | A  * | 7/1997 | Riggio, Jr. ................... | 323/285 |
| 6,058,034 | A  * | 5/2000 | Cummings et al. ........... | 363/74 |
| 6,411,531 | B1 * | 6/2002 | Nork et al. .................... | 363/60 |
| 6,429,632 | B1 * | 8/2002 | Forbes et al. ................ | 323/282 |
| 6,788,039 | B1 * | 9/2004 | Abdoulin ..................... | 323/288 |
| 7,009,372 | B1 * | 3/2006 | Sutardja et al. ............. | 323/283 |
| 7,053,594 | B1 * | 5/2006 | Sutardja et al. ............. | 323/283 |

* cited by examiner

*Primary Examiner*—Adolf Berhane
(74) *Attorney, Agent, or Firm*—Adam L. Stroud

(57) ABSTRACT

The invention relates to a control system for a voltage converter, said control system comprising:—a set of switches (T1-T2-T3-T4) intended to be connected via output terminals (N1-N2-N3) to a first type of voltage converter or to a second type of voltage converter,—detection means (DET) to generate a detection signal (DS) indicating the type of converter connected,—a circuit (CIR) intended to generate, from said detection signal (DS), control signals (CS1-CS2-CS3-CS4) to control said switches (T1-T2-T3-T4).

5 Claims, 7 Drawing Sheets

CONTROL SYSTEM FOR A VOLTAGE CONVERTER

FIELD OF THE INVENTION

The invention relates to a control system for a voltage converter.

The invention has several applications in electronic systems using voltage converters.

BACKGROUND OF THE INVENTION

Many electronic equipments having only a very low level input voltage use a voltage converter to generate an output voltage of higher amplitude.

In particular, switched capacitor converters and inductance converters are currently used to increase the amplitude of an input voltage. These two types of converters described in FIG. 1 and FIG. 3 respectively use transistors T1-T2-T3-T4 which play the role of switches. The transistors are controlled by control signals CS1-CS2-CS3-CS4 delivered by a specific circuit. In order that the voltage converter completely fulfills its role, it is necessary for the control signals to be adapted to the type of voltage converter used.

To generate control signals adapted to the type of voltage converter used, it is necessary to have as many specific circuits as the number of voltage converters, which is highly limiting, costly and non-optimal in terms of integration size.

OBJECT AND SUMMARY OF THE INVENTION

It is an object of the invention to propose a control system for a voltage converter which arbitrarily and automatically allows to control a switched capacitor converter or an inductance converter.

To this end, the control system according to the invention comprises:
- a first switch, a second switch, a third switch and a fourth switch connected in series,
- said first switch having a first output terminal,
- the common terminal of said first switch and said second switch defining a second output terminal,
- the common terminal of said second switch and said third switch being intended to be connected to an input voltage,
- the common terminal of said third switch and said fourth switch defining a third output terminal,
- said fourth switch having another output terminal intended to be connected to a ground potential,
- said first, second and third output terminals being intended to be connected to a voltage converter of a first type or to a voltage converter of a second type,
- detection means connected to said third output terminal, to generate a detection signal indicating said first type or said second type of voltage converter,
- a circuit intended to generate, from a clock signal and said detection signal, control signals intended to control said first, second, third and fourth switches.

The detection of the type of converter is based on the detection of the elements forming the converter which is connected by a user to the output terminals. This detection is automatic considering that no manual intervention is necessary once the converter elements are connected. The detection signal adopts a first state if a user connects a switched capacitor converter and a second state if a user connects an inductance converter. The detection signal is used as a parameter in a logic gates network implemented in said circuit, and whose output levels define the control signals. The control signals are therefore automatically suited to the type of converter which is connected, by using a single circuit for generating them.

To detect the type of voltage converter connected to the control system, the detection means comprise:
- means for injecting a current at said third output terminal,
- comparing means to compare the potential of said third output terminal, with a reference potential.

The injection of a negative current at said particular output terminal allows to determine, via the measurement of the potential on this particular output terminal, whether the element that forms the converter and which is connected to this output terminal, is of a capacitive or inductive type. A quasi-zero potential on this particular output terminal characterizes the presence of an element of capacitive nature, which allows to affirm that a switched capacitor converter is connected. A potential close to the supply potential on this particular output terminal characterizes the presence of an element of inductive nature, which allows to affirm that an inductance converter is connected. The detection of these two levels is advantageously performed by the comparing means (i.e. a comparator) generating the detection signal.

BRIEF DESCRIPTION OF THE DRAWINGS

The invention will be further described with reference to examples of embodiments shown in the drawings to which, however, the invention is not restricted. In the drawings.

DETAILED DESCRIPTION OF THE INVENTION

Figure 1:
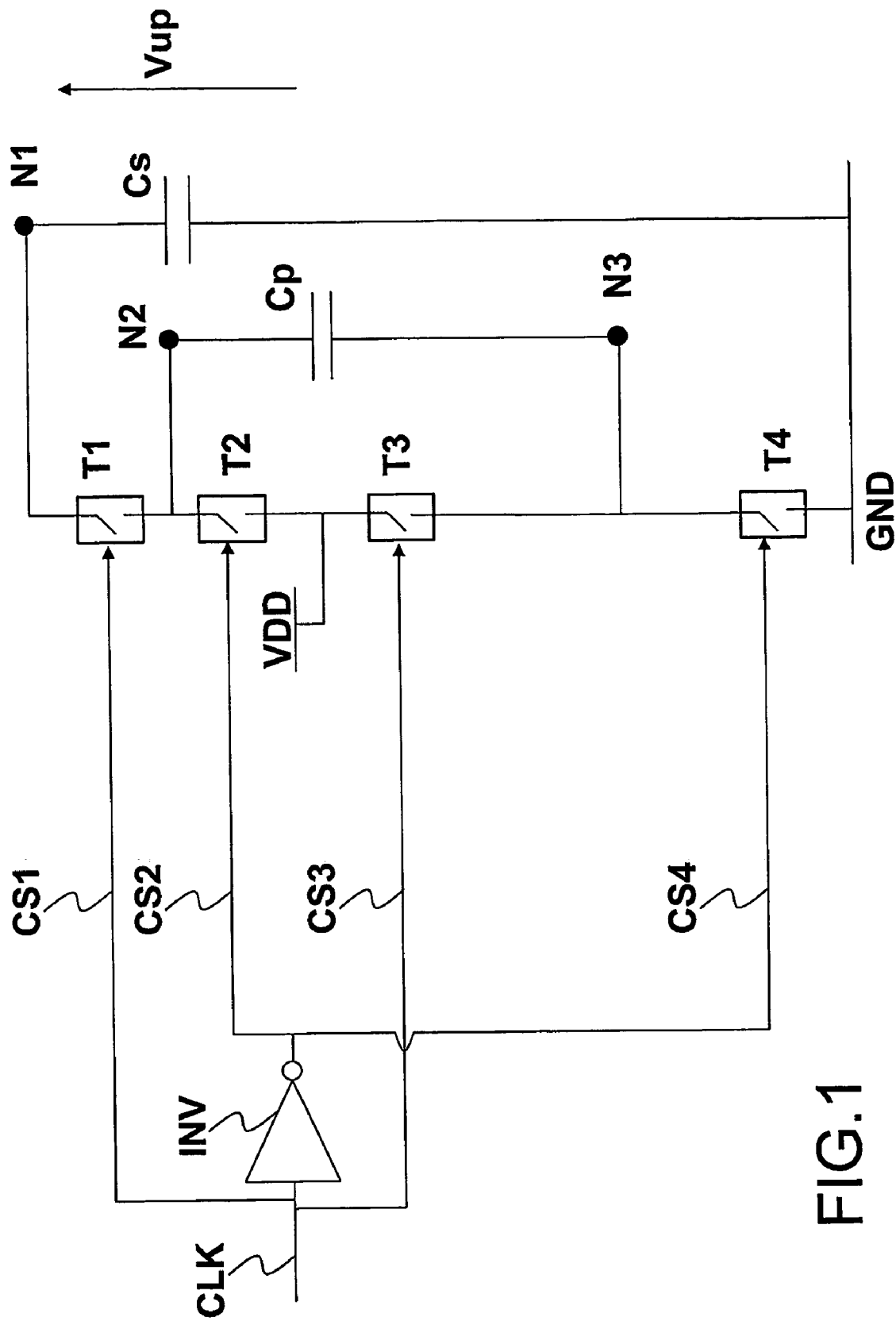
FIG. 1 describes a switched capacitor converter.

FIG. 1 describes a switched capacitor voltage converter which allows to double the input voltage VDD.

This voltage converter uses four transistors T1-T2-T3-T4 which each plays the role of a switch, as well as a capacitor Cp. The transistors T1 and T3 are closed on the high levels of the clock signal CLK, whereas the transistors T2 and T4 are closed on the low levels of the clock signal CLK via the inverter INV.

When T2 and T4 are equal to closed switches, the capacitor Cp gets charged till there is a potential difference of $U_{CP}$=VDD on its terminals. When T1 and T3 are in their turn equal to closed switches, the terminal N3 is connected to the input voltage VDD, which, taking into account the charged condition of the capacitor Cp, brings the output terminal N1 to the potential 2*VDD. The output voltage Vup is thus doubled with respect to the input voltage VDD.

The capacitor Cs allows to reduce the ripple of the output voltage.

Figure 2:
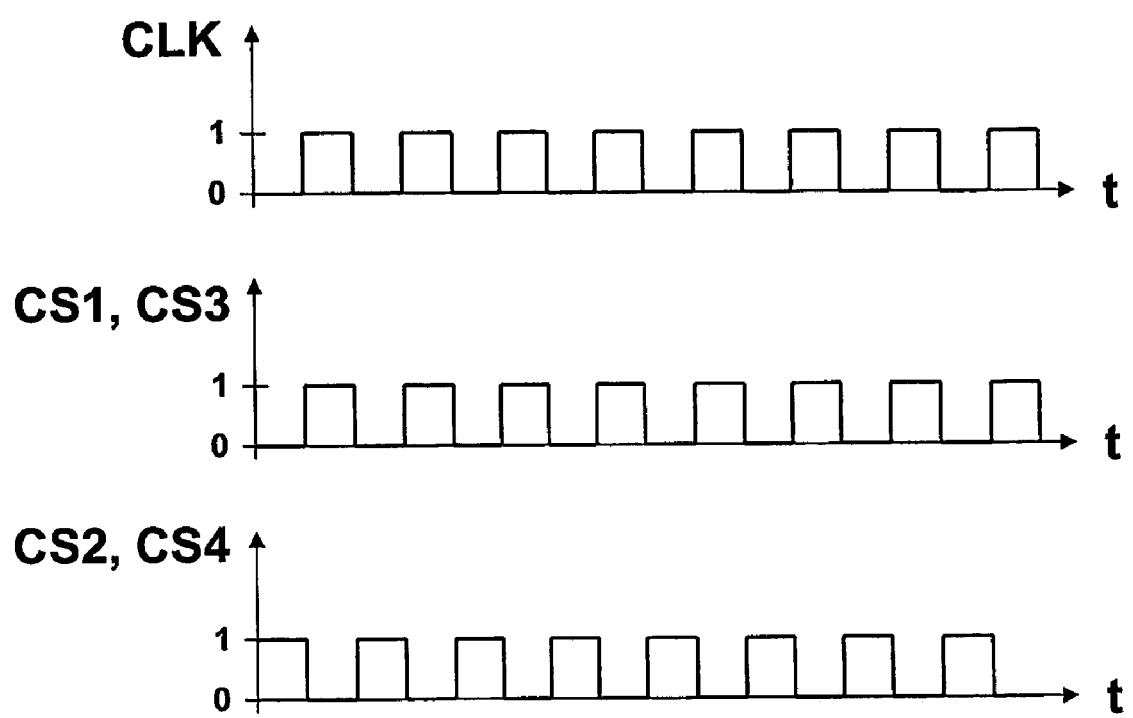
FIG. 2 represents the control signals of a switched capacitor converter.

FIG. 2 represents the control signals of a switched capacitor converter as described in the FIG. 1. The control signals CS1 and CS3 of the switches T1 and T3 are identical to the clock signal CLK, whereas the control signals CS2 and CS4 of the switches T2 and T4 are reversed with respect to the clock signal CLK.

Figure 3:
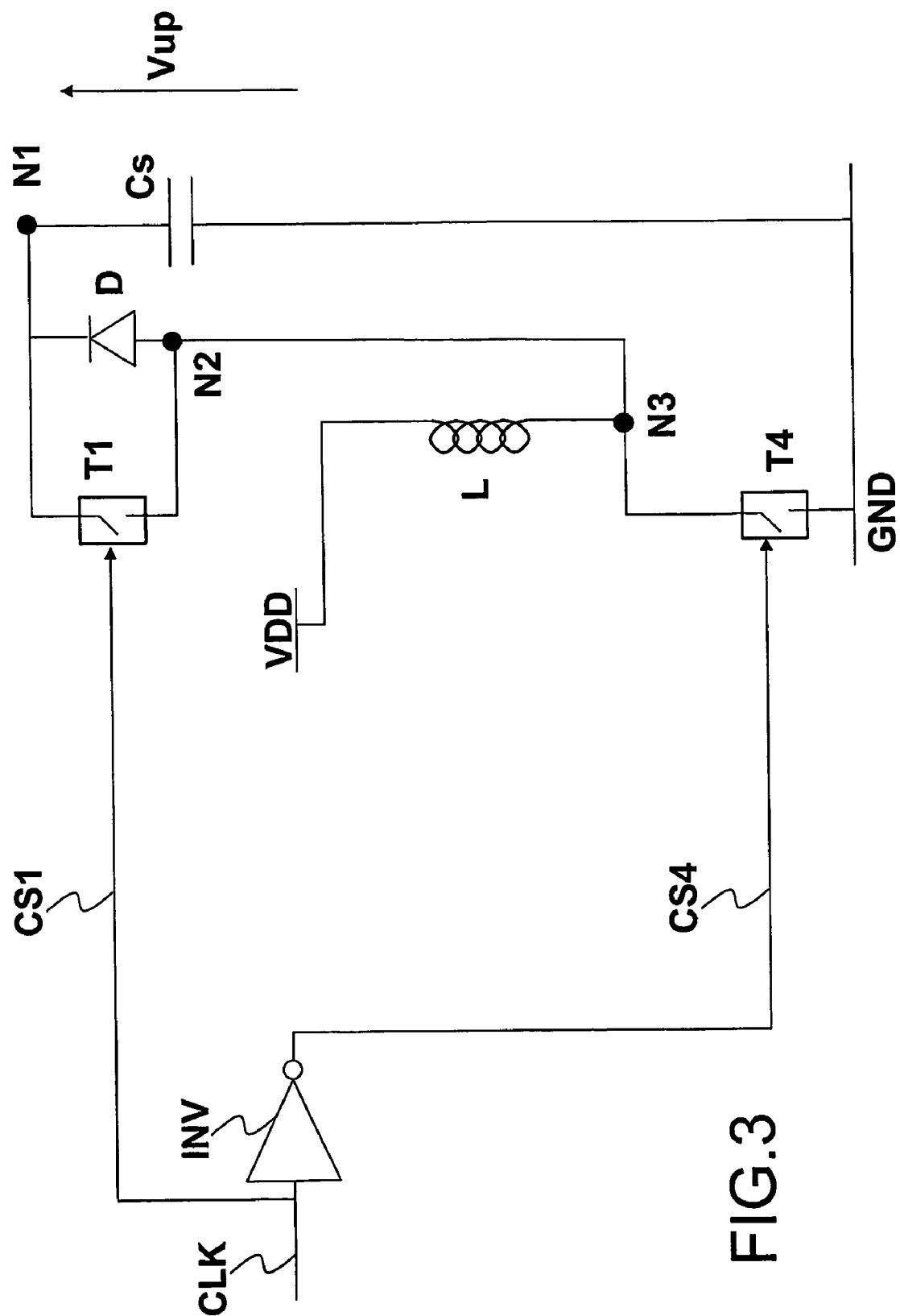
FIG. 3 describes an inductance converter.

FIG. 3 describes an inductance voltage converter which allows to generate an output voltage Vup of a level greater than that of the input voltage VDD.

This voltage converter uses two transistors T1 and T4 which each plays the role of switch, an inductance L (or self), as well as a diode D. The transistor T1 is closed on the high levels of the clock signal CLK, whereas the transistor T4 is closed on the low level of the clock signal CLK via the inverter INV.

When T4 is equivalent to a closed switch, the inductance L is connected to the input voltage VDD and stores the energy in magnetic form. The diode D is then blocked. When T1 in its turn is equivalent to a closed switch, T4 is equivalent to an open switch. The energy stored in the inductance L is then restored in the output capacitor Cs through the diode D. The switch T4 is then equivalent to a closed switch so as to limit the energy losses. This restoration of energy allows to generate a potential greater than the input voltage VDD and temporarily greater than the voltage on the capacitor Cs, on an output terminal N1. The output voltage Vup is thus greater than the input voltage VDD.

The capacitor Cs allows to reduce the ripple of the output voltage.

Figure 4:
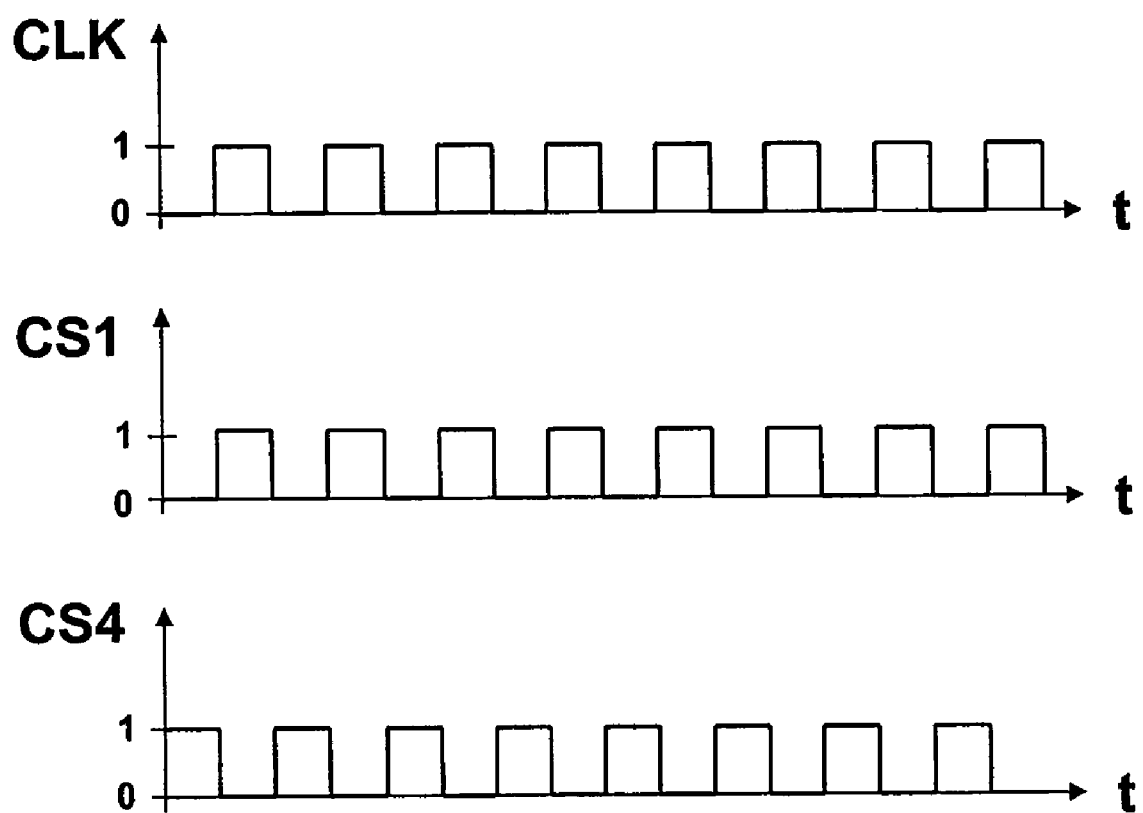
FIG. 4 represents the control signals of an inductance converter.

FIG. 4 represents the control signals of an inductance converter as described in FIG. 3. The control signal CS1 of the switch T1 is identical to the clock signal CLK, whereas the control signal CS4 of the switch T4 is reversed with respect to the clock signal CLK.

Figure 5:
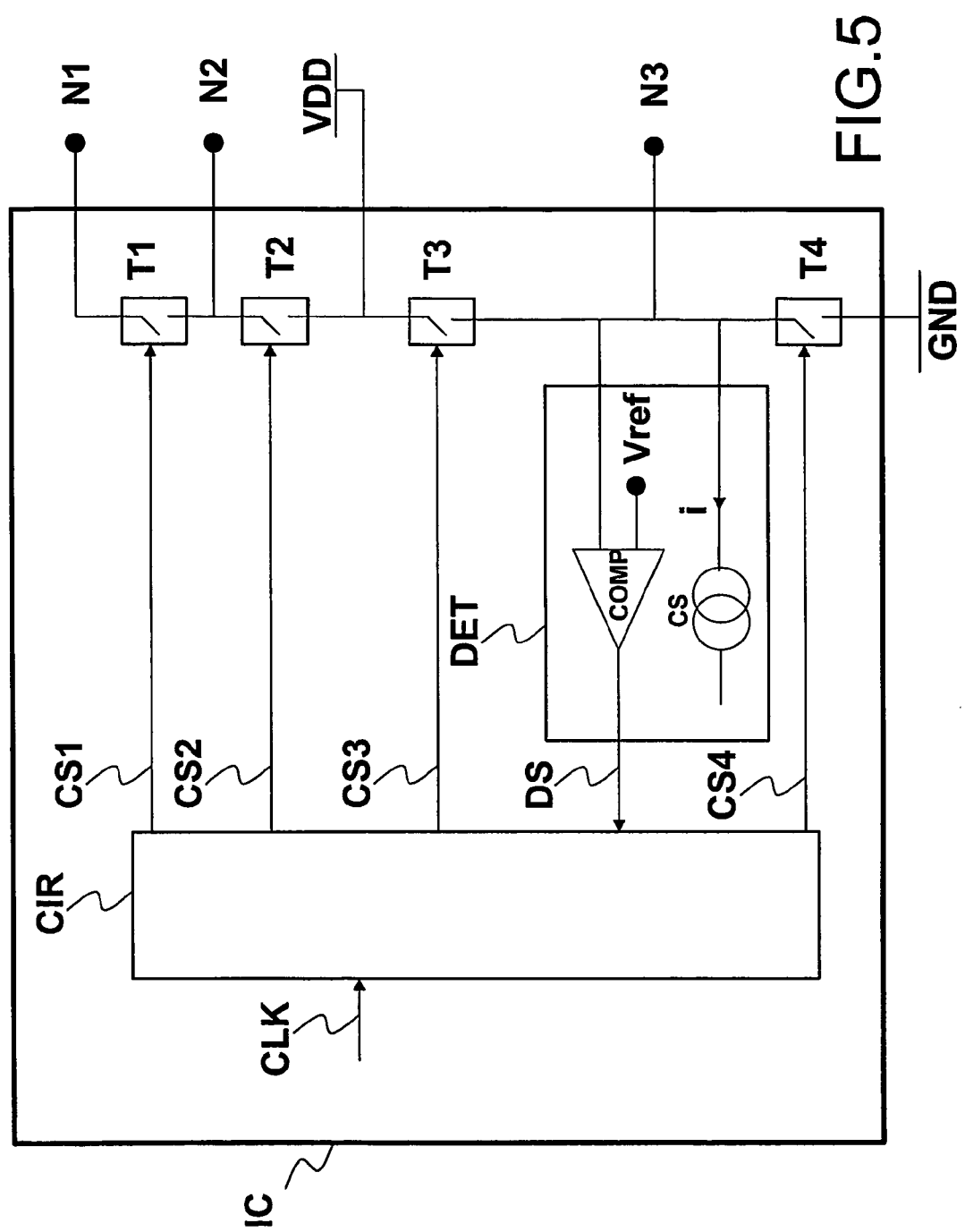
FIG. 5 describes a control system according to the invention for controlling a voltage converter.

FIG. 5 describes a control system according to the invention to control a voltage converter.

The control system comprises a set of switches T1-T2-T3-T4 intended to be connected via the output terminals N1-N2-N3 to a first type of voltage converter or to a second type of voltage converter. The control system comprises:
- a first switch T1 comprising a first terminal defining a first output terminal N1, and a second terminal defining a second output terminal N2,
- a second switch T2 comprising a first terminal connected to said second output terminal N2, and a second terminal connected to the supply potential VDD,
- a third switch T3 comprising a first terminal connected to said supply potential VDD and a second terminal defining a third output terminal N3,
- a fourth switch T4 comprising a first terminal connected to said third output terminal N3 and a second terminal connected to a ground potential GND.

The switches T1-T2-T3-T4 correspond, for example, to bipolar transistors controlled on their base or to MOS type transistors controlled on their gate.

A first type of voltage converter that can be connected to the output terminals N1-N2-N3 is a switched capacitor voltage converter as described in FIG. 1. For this purpose, the capacitor Cp must be connected between the terminals N2 and N3 and the capacitor Cs must be connected between the terminal N1 and the ground potential GND.

A second type of voltage converter that can be connected to the output terminals N1-N2-N3 is an inductance voltage converter as described in FIG. 3. For this purpose, the inductance L must be connected between the terminals N3 and the supply voltage VDD, the diode D must be connected between the terminals N1 and N2, and the capacitor Cs must be connected between the terminal N1 and the ground potential GND.

The control system also comprises detection means DET for generating a detection signal DS that indicates the type of converter that is connected to the output terminals N1-N2-N3.

The detection is carried out by opening the switches T3-T4 and closing the switches T1-T2.

The detection means DET comprise means to inject a current i having a negative value (i.e. extract a current of positive value) at the particular output terminal N3, for example by means of a current source CS. The detection means DET also comprise comparing means COMP to compare the potential of said particular output terminal N3 with a reference potential Vref. If the potential of the output terminals N3 is greater than the reference potential Vref, the detection signal DS generated by the comparator COMP adopts a first state. If the potential of the output terminals N3 is lower than the reference potential Vref, the detection signal DS generated by the comparator COMP adopts a second state. The value of the reference potential Vref is suitably chosen between the ground potential GND and the supply potential VDD.

To determine the type of converter connected to the control system according to the invention, the detection which allows to generate the detection signal DS is performed when the control system is power supplied, so that the injection of the current i does not disturb the operation of the voltage converter and the measurement of the potential of the output terminal N3 is not altered when the switches are activated. The signal detection level DS is advantageously memorized, for example by means of a flip-flop (not shown).

If a switched capacitor converter is connected to the control system according to the invention, the capacitor Cp connected between the terminals N2 and N3 is discharged via the injection of the current i, which results in a reduction of the potential N3 towards the ground potential GND. A quasi-zero potential on the output terminal N3 therefore characterizes the presence of an element of capacitive nature, which allows to affirm that a switched capacitor converter is connected to the control system.

If an inductance converter is connected to the control system according to the invention, due to the presence of the inductance L, the injected current i has no effect on the potential of the output terminal N3 which is then equal to the supply potential VDD. A potential close to the supply potential on the output terminal N3 therefore characterizes the presence of an inductive type of element, which allows to affirm that an inductance converter is connected to the control system.

The control system also comprises a circuit CIR intended to generate control signals CS1-CS2-CS3-CS4 from said detection signal DS, to control the switches T1-T2-T3-T4, respectively.

The circuit CIR receives on its input, a clock signal CLK to clock a network of logic gates intended to generate the control signals CS1-CS2-CS3-CS4.

The circuit CIR also receives the detection signal DS which is used as a parameter. In fact, when the detection signal is in the first state, a first set of control signals is generated to control the switches of a first type of voltage converter (for example an inductance converter), and when the detection signal is in a second state, a second set of control signals is generated to control the switches of a second type of voltage converter (for example a switched capacitor converter).

Figure 6:
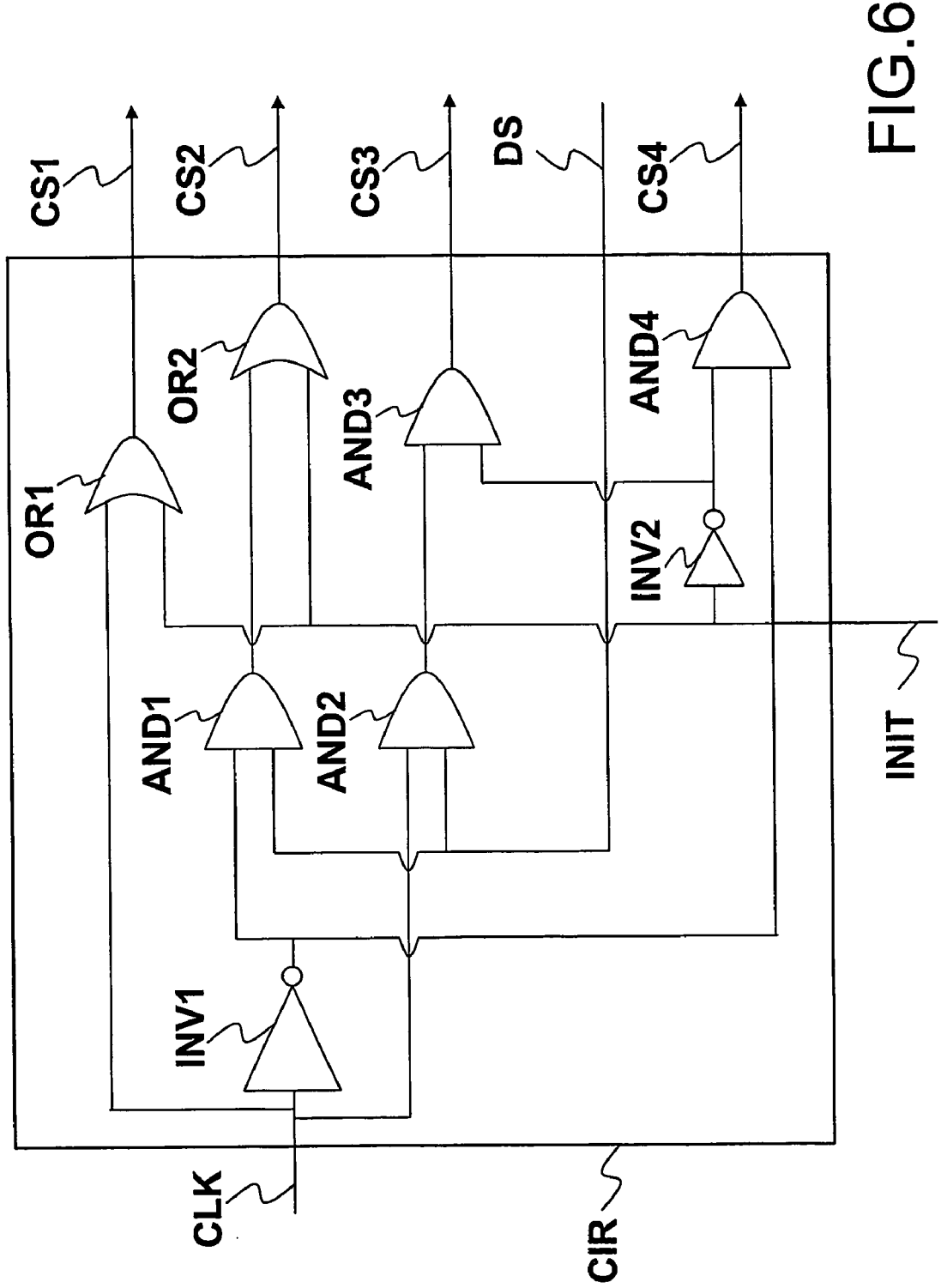
FIG. 6 describes a circuit comprised in said control system according to the invention to generate control signals for a voltage converter.

FIG. 6 describes the circuit CIR included in the control system according to the invention, to generate control signals CS1-CS2-CS3-CS4 to a voltage converter.

The circuit CIR comprises a logic gate OR1 of the OR type which receives the clock signal CLK on one input and an initialization signal INIT on another input to generate the control signal CS1.

The circuit CIR comprises an inverter INV1 to reverse the clock signal CLK.

The circuit CIR comprises a logic gate AND4 of the AND type which receives the output signal of the inverter INV1 on one input and the logic initializing signal INIT reversed by an inverter INV2 on another input, to generate the control signal CS4.

The circuit CIR comprises a logic gate AND1 of the AND type which receives the output signal of the inverter INV1 on one input and the detection signal DS on another input, to generate an output signal on an input of a logic gate OR2 of the OR type. The logic gate OR2 receives the logic initialization signal INIT on another input and generates the control signal CS2 on its output.

The circuit CIR comprises a logic gate AND2 of the AND type which receives the clock signal CLK on one input and the detection signal DS on another input, to generate an output signal on one input of a logic gate AND3 of the AND type. The logic gate AND3 receives the output signal from the inverter INV2 on another input and generates the control signal CS3 on its output.

To detect the type of voltage converter that is connected to the control system according to the invention, the initialization signal INIT is applied with a high level. The control signals CS1 and CS2 of the gates OR1 and OR2 are then forced to the high level, which closes the switches T1-T2, and the output control signals CS3 and CS4 of the gates AND3 and AND4 are forced to the low level, which opens the switches T3-T4. The detection of the type of voltage converter can then be made by the detection means DET as seen earlier, so as to define the detection signal level DS.

Once the type of voltage converter which is connected to the control system is detected by the detection means DET, for example after a given time duration fixed by a timer system (not represented) has elapsed, the initialization signal level INIT comes back to the low level, which causes the level of the detection signal DS to be stored (for example by means of a flip-flop which is not represented). The initialization signal INIT then no longer plays any static action on the state of the switches T1-T2-T3-T4, said switches T1-T2-T3-T4 being now actuated by the control signals CS1-CS2-CS3-CS4 defined as follows:

the control signal CS1 is equal to the clock signal CLK,
the control signal CS2 is equal to the output signal of the logic gate AND1,
the control signal CS3 is equal to the output signal of the logic gate AND2,
the control signal CS4 is equal to the output signal of the inverter INV1.

When the detection signal DS is at the low level, for example in the case where an inductance voltage converter is connected to the control system according to the invention, the output signal of the logic gate AND1 is at the low level, and the output signal of the logic gate AND2 is at the low level. Thus, only the switches T1 and T4 are therefore dynamically controlled by the control signals CS1 and CS4, the switches T2 and T3 remaining open considering that the control signals CS2 and CS3 are at the low level.

When the detection signal DS is at the high level, for example in the case where a switched capacitor voltage converter is connected to the control system according to the invention, the output signal from the logic gate AND1 is equal to the output signal of the inverter INV1, and the output signal of the logic gate AND2 is equal to the clock signal CLK. Thus, the control signals CS2 and CS4 vary dynamically to the rhythm of the output signal of the inverter INV1, and the control signals CS1 and CS3 vary dynamically to the rhythm of the clock signal CLK.

Figure 7:
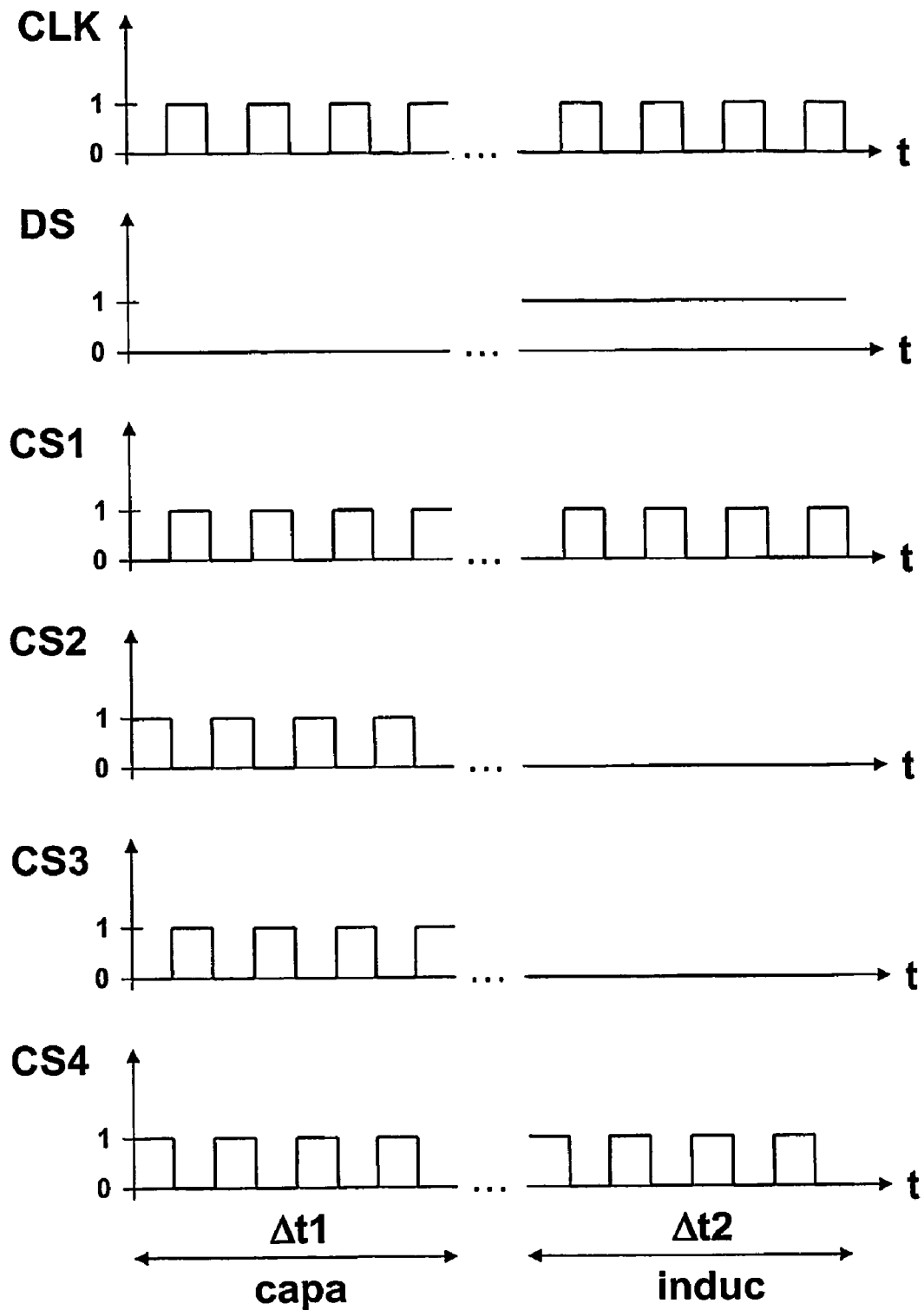
FIG. 7 represents the control signals of a voltage converter generated by a control system according to the invention.

FIG. 7 represents the control signals of a control system according to the invention as described in the FIG. 6.

In the time interval $\Delta t1$, the detection signal DS adopts a first low state indicating that a switched capacitor voltage converter is connected to the control system according to the invention. In this time interval, the control signals CS1 and CS3 of the switches T1 and T3 are identical to the clock signal CLK, whereas the control signals CS2 and CS4 of the switches T2 and T4 are reversed with respect to the clock signal CLK.

In the time interval $\Delta t2$, the detection signal DS adopts a second high state reflecting that an inductance voltage converter is connected to the control system according to the invention. In this time interval, the control signal CS1 of the switch T1 is identical to the clock signal CLK, whereas the control signal CS4 of the switch T4 is reversed with respect to the clock signal CLK. The control signals CS2 and CS3 remain at the low level.

As illustrated in FIG. 5, the control system according to the invention may advantageously implemented in an integrated circuit IC comprising three output terminals N1-N2-N3 intended to be connected to a switched capacitor voltage converter or to an inductance converter as described previously.

The invention claimed is:

1. A control system for a voltage converter, said control system comprising:
    a first switch, a second switch, a third switch and a fourth switch connected in series,
    said first switch having a first output terminal,
    the common terminal of said first switch and said second switch defining a second output terminals,
    the common terminal of said second switch and said third switch being intended to be connected to an input voltage,
    the common terminal of said third switch and said fourth switch defining a third output terminals,
    said fourth switch having another output terminal intended to be connected to a ground potential,
    said first, second and third output terminals being intended to be connected to a voltage converter of a first type or to a voltage converter of a second type,
    detection means connected to said third output terminal, to generate a detection signal indicating said first type or said second type of voltage converter,
    a circuit intended to generate, from a clock signal and said detection signal, control signals intended to control said first, second, third and fourth switches.

2. A control system as claimed in the claim 1, wherein the detection means comprise:
    means for injecting a current at said third output terminal,
    comparing means to compare the potential of said third output terminal, with a reference potential.

3. A control system as claimed in claim 1, wherein said voltage converter of a first type comprises:
    an inductance connected between said input voltage and said third output terminal,
    a diode connected between said first output terminal and said second output terminal.

4. A control system as claimed in claim 1, wherein said voltage converter of a second type comprises a capacity connected between said second output terminal and said third output terminal (N3).

5. An integrated circuit comprising a control system for a voltage converter as claimed in claim 1.

* * * * *